United States Patent Office 3,551,389
Patented Dec. 29, 1970

3,551,389
PROCESS FOR THE POLYMERIZATION OF AROMATIC POLYBENZIMIDAZOLES
Arthurt E. Prince, Jr., Basking Ridge, N.J., assignor to Celanese Corporation, New York, N.Y., a corporation of Delaware
No Drawing. Filed Mar. 4, 1969, Ser. No. 804,309
Int. Cl. C08g 33/02
U.S. Cl. 260—78.4                               9 Claims

ABSTRACT OF THE DISCLOSURE

Aromatic polybenzimidazoles are prepared by an improved two-stage process wherein the second stage reaction is conducted in the presence of phenol to increase the molecular weight of the resulting polymer product.

BACKGROUND OF THE INVENTION

Field of the invention

The present invention relates generally to aromatic polybenzimidazoles, and more particularly, to an improved two-stage process for the preparation of aromatic benzimidazoles, and more particularly, to an improved two-stage process for the preparation of aromatic benzimidazoles wherein the second stage reaction is conducted in the presence of phenol to increase the molecular weight of the resulting polymer product.

Description of the prior art

Polybenzimidazoles, and particularly aromatic polybenzimidazoles, are characterized by a high degree of thermal stability. They may be shaped to form fibers, films and other articles of wide utility which show great resistance to degradation by heat, hydrolytic media, and oxidizing media.

Typical processes for preparing the aromatic polybenzimidazoles are described, for example, in U.S. Re. Pat. No. 26,065, and in Vogel et al., Journal of Polymer Science, vol. 50, pp. 511 through 539 (1961).

The search has continued, however, for improved processes able to produce higher molecular weight aromatic polybenzimidazoles, from which shaped articles such as films and fibers having improved physical properties, due to the higher molecular weight, can be formed.

The present invention was made as the result of this search for such processes.

SUMMARY OF THE INVENTION

Accordingly, the primary object of the present invention is to provide an improved process for the polymerization of aromatic polybenzimidazoles, and particularly aromatic polybenzimidazoles having a higher molecular weight than the polymers produced by the the corresponding prior art two-stage process.

Other objects will be apparent from the following description.

In accordance with the present invention, aromatic polybenzimidazoles are prepared in a two-stage process wherein the second stage reaction is conducted in the presence of phenol.

The essence of the present invention is the discovery that the presence of phenol in the second stage reaction results in a final polymer product having a higher molecular weight than that which can ordinarily be obtained, i.e., in the absence of phenol in the second stage.

Aromatic polybenzimidazoles having a higher molecular weight are desirable as such polymers have been found to yield shaped articles such as fibers and films having improved physical properties.

DETAILED DESCRIPTION OF THE INVENTION

Aromatic polybenzimidazoles are a known class of heterocyclic polymers which consist essentially of recurring units of the following Formulas I and II. Formula I is:

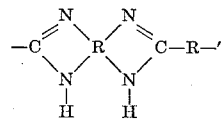

wherein R is a tetravalent aromatic nucleus, with the nitrogen atoms forming the benzimidazole rings being paired upon adjacent carbon atoms, i.e., ortho carbon atoms, of the aromatic nucleus, and R' is a member of the class consisting of an aromatic ring and a heterocyclic ring such as pyridine, pyrazine, furan, quinoline, thiophene, and pyran.

Formula II is:

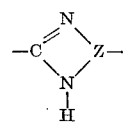

wherein Z is an aromatic nucleus having the nitrogen atoms forming the benzimidazole ring paired upon adjacent carbon atoms of the aromatic nucleus.

Any of the above aromatic PBIs represented by the Formulas I and II may be prepared according to the process of the present invention.

As set forth in U.S. Pat. No. 3,174,947 and Re. Pat. 26,065, which are incorporated herein by reference, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the auto-condensation of phenyl-3,4-diaminobenzoate.

Also set forth in the above-mentioned patents, the aromatic polybenzimidazoles having the recurring units of Formula I may be prepared by condensing an aromatic tetraamine compound containing a pair of ortho diamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the class consisting of pyridine, pyrazine, furan, quinoline, thiophene and pyran and (c) an anhydride of an aromatic dicarboxylic acid.

The following generalized equation illustrates the condensation reaction which occurs in forming the polybenzimidazoles having the recurring units of Formula I (R and R' are aromatic):

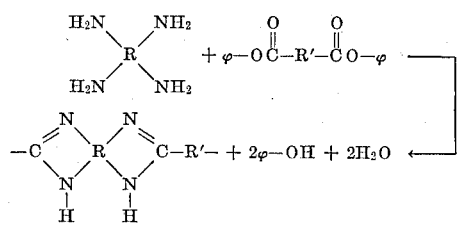

Suitable R aromatic radicals are a single aromatic ring such as

1,2,4,5-phenylene; a polynuclear fused aromatic ring such as

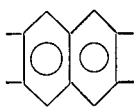

2,3,6,7-naphthylene; and a polynuclear aromatic ring such as

3,3',4,4'-biphenylene or

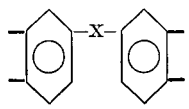

wherein X is

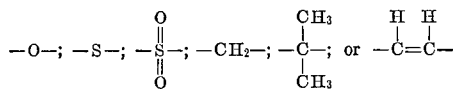

The aromatic R' (divalent) radical may also be a single aromatic ring; fused polynuclear aromatic rings; or polynuclear aromatic rings such as described above with respect to the tetraamine derived (tetravalent) R radical.

These R' aromatic compounds, which are derived from corresponding diphenyl esters of aromatic dicarboxylic acids or anhydrides of the acids, and the tetraamines may be further substituted with small non-reactive substituents on the aromatic nuclei. Thus, the aromatic nuclei may additionally bear lower alkyl groups as methyl or ethyl substituents, lower alkoxy groups as methoxy or ethoxy substituents or other similar small substituents which are not capable of reaction, under the conditions of condensation with the ortho diamino reactive centers or with the carboxylic acid reactive centers. Mixtures of the various tetraamines and dicarboxyl compounds may be used to form copolymers.

Examples of polybenzimidazoles which have the recurring structure of Formula I and which may be prepared according to the process of the present invention include:

poly-2,2'(m-phenylene)5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4"')-5,5'-bibenzimidazole;
poly-2,6-(m-phenylene)-diimidazobenzene;
poly-2,2'(m-phenylene)-5,5'-di(benzimidazole)ether;
poly-2,2'(m-phenylene)-5,5'-di(benzimidazole)sulfide;
poly-2,2'(m-phenylene)-5,5'-di(benzimidazole)sulfone;
poly-2,2'(m-phenylene)-5,5'-di(benzimidazole) methane;
poly-2'2"(m-phenylene-5',5"-di(benzimidazole) propane-2,2; and
poly-2',2"(m-phenylene)-5',5"-di(benzimidazole) ethylene-1,2 where the double bonds of the ethylene groups are intact in the final polymer.

Preferably, equimolar quantities of the monomeric tetraamine and dicarboxyl compound are introduced into a first stage melt polymerization reaction zone and heated therein at a temperature above about 170° C., preferably at least 200° C., and more preferably from about 250 to 300° C. The reaction is conducted in a substantially oxygen-free atmosphere, i.e., below about 20 p.p.m. oxygen and preferably below about 8 p.p.m. oxygen, until a foamed prepolymer is formed. Usually, the first stage reaction is continued until a prepolymer is formed having an inherent viscosity, expressed as deciliters per gram, of at least 0.1, and preferably from about 0.13 to 0.3, the inherent viscosity (I.V.) as used in the present specification and claims being determined from a solution of 0.4 gram of the polymer in 100 ml. of 97 percent $H_2SO_4$ at 25° C.

After the conclusion of the first stage reaction, which normally takes at least 0.5 hour and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.6, e.g., 0.80 to 1.1 or more.

The temperature employed in the second stage is at least 250° C., preferably at least 325° C., and more preferably from about 350 to 425° C. The second stage reaction generally takes at least 0.5 hour, and preferably from about 1 to 4 hours or more.

The process of the present invention preferably employes a pressure equal to at least atmospheric pressure, e.g., 1 to 2 atmospheres, and preferably atmospheric pressure, in each of the reaction zones. For example, an inert gas such as nitrogen can be continuously passed through each of the reaction zones during the respective polybenzimidazole polymerization reactions to achieve these pressures.

Further, as the nitrogen is passed through the vapor space of the reaction zones in any convenient manner, volatile by-products such as phenol and water may be removed from the reaction zones as they are formed or evolved. Any reactants evolved with the volatile by-products may be condensed and refluxed to the first stage reaction zone by means well known to those skilled in the art, to increase the yield of prepolymer.

The nitrogen employed should be substantially oxygen-free, i.e., contain less than about 20 p.p.m. of oxygen, preferably less than about 8 p.p.m., and more preferably, be oxygen-free. The nitrogen is introduced into the reaction zone at a rate of flow measured at standard conditions, that is, atmospheric pressure and temperature, in the range of from about 1 to 200 percent of the volume of the reaction zone per minute. The nitrogen gas can be passed into the polymerization reaction zone at room temperature or if desired, preheated to the reaction temperature.

As a result of using a continuous flow of nitrogen and at least atmospheric pressure conditions in each reaction zone, the product polybenzimidazole polymer has a molecular weight, expressed as I.V., which is comparable to that obtained via the two-stage reduced pressure process, but contains less gels and insolubles. The lower gel and insoluble content decreases the extent of filtration involved in forming suitable spinning or casting solutions.

In contrast to prior art two-stage processes, the process of the present invention conducts the second stage reaction in the presence of phenol, also known or referred to as hydroxybenzene, benzophenol, phenylic acid, or carbolic acid, and which may be represented by the following structural formula:

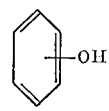

Phenol normally has a melting point of about 43° C., a normal boiling point of about 182° C., and can be obtained in such physical forms as a fused solid, crystals, or liquid, in several grades of purification, e.g., 82%, 90%, or 95% phenol, with the remainder mostly cresols, being available.

The phenol may be present in the second stage reaction mixture in an amount of about 5 to 50 percent, preferably about 5 to 25 percent, and most preferably about 10 to 20 percent, based on the weight of the prepolymer present.

In those instances where phenyl ester reactant monomers described herein are used, the phenol for the second stage reaction may be obtained from the condensate of the volatile by-products (phenol and water) evolved during the first stage reaction.

The manner in which phenol is otherwise obtained, i.e., made, derived, or recovered, is well known and not a part of the present invention.

The other materials which may be similarly employed in lieu of all or a portion, e.g., five to ninety-five weight percent, of phenol are diphenyl ether, biphenyl, and the cresols such as m-cresol.

The invention is additionally illustrated in connection with the following examples wherein the preferred polybenzimidazole polymer is used, namely, poly-2,2'-(m-phenylene)-5,5'-bibenzimidazole, the recurring unit of which is

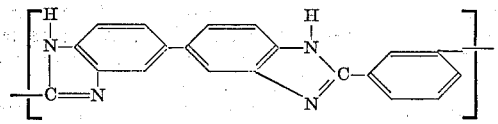

EXAMPLE I

Stoichiometric quantities of pure 3,3'-diaminobenzidine (600 grams) and diphenylisophthalate (891 grams) are charged to a fifteen gallon, agitated hot oil heated stainless steel reactor. The reactor is freed of all air by purging several times with deoxygenated nitrogen followed by a constant flow of 2 standard cubic feet per hour of nitrogen through the reactor in which a pressure of about one atmosphere is maintained. The oil is preheated to 150° C. and heated to 290° C. in 40 to 50 minutes. At about 260° C., phenol and water are evolved. When the mass becomes exceedingly viscous, agitation is stopped and heating at 290° C. is continued for about 1.3 hours to conclude the first stage of the reaction.

Prepolymer from the first stage, which is in the form of a voluminous foam and has an inherent viscosity of 0.21, is pulverized and charged to a second, one gallon electrically heated agitated reactor, along with ten weight percent phenol, based on the weight of the prepolymer. The vapor space of this reactor is likewise purged several times with deoxygenated nitrogen and a constant flow of about 1.0 standard cubic foot per hour of such nitrogen is maintained through the reactor during the entire second stage of the reaction, which is also carried out at about one atmosphere of pressure. The batch is gradually heated to about 375° C. and kept at that temperature for about four hours to conclude the second stage of the reaction. The final poly-2,2'-(m-phenylene)-5,5'-bibenzimidazole is found to have an inherent viscosity of 0.86.

EXAMPLE II

Prepolymer from the first stage of Example I is pulverized and charged to a one gallon electrically heated agitated reactor, but no phenol is added. The vapor space of this reactor is likewise purged several times with deoxygenated nitrogen and a constant flow of about 1.0 standard cubic foot per hour of such nitrogen is maintained through the reactor during the entire second stage of the reaction, which is also carried out at about 1 atmosphere of pressure. The batch is gradually heated to about 375° C. and kept at that temperature for about 4 hours to conclude the second stage of the reaction. The final poly-2,2'-(m-phenylene)-5,5'-bibenzimidazole is found to have an inherent viscosity of 0.78, which is significantly lower than the I.V. of the polymer obtained in the above Example I.

EXAMPLE III

Example II is repeated with the exception that ten weight percent water is charged to the reactor with the prepolymer. The final polymer is found to have an inherent viscosity of 0.77.

EXAMPLE IV

Example II is repeated with the exception that ten weight percent phenol and ten weight percent water is charged to the reactor with the prepolymer. The final polymer is found to have an inherent viscosity of 0.87.

EXAMPLE V

Example II is repeated with the exception that 10 weight percent of the condensed by-products, one-half by weight phenol and one-half by weight water, evolved from the first stage of Example I, is charged to the reactor with the prepolymer. The final polymer is found to have an inherent viscosity of about 0.9.

EXAMPLES VI–IX

To demonstrate the beneficial effect of high inherent viscosity (I.V.) on spun and drawn yarn properties, poly-2,2'-m-phenylene-5,5'-bibenzimidazole having varying I.V.'s were subjected to identical spinning and drawing procedures, well known in the art and not a part of the present invention, to determine the effects on yarn properties. The results are summarized in the following table:

|  | I.V. |  | As-spun properties |  |  | Drawn properties |  |  |
|---|---|---|---|---|---|---|---|---|
|  | Polymer | Yarn | Tenacity, g./d. | Elongation, percent | $TE^{1/2}$ | Tenacity, g./d. | Elongation, percent | $TE^{1/2}$ |
| Example: |  |  |  |  |  |  |  |  |
| VI | 0.7 | 0.7 | 1.7 | 112 | 18 | 4.9 | 22 | 23 |
| VII | 0.95 | 0.90 | 1.9 | 116 | 20 | 5.1 | 26 | 26 |
| VIII | 1.1 | 0.95 | 1.9 | 123 | 21 | 5.5 | 22 | 26 |
| IX | 1.3 | 1.1 | 2.0 | 138 | 23 | 5.8 | 25 | 29 |

The significance of the tensile factor, $TE^{1/2}$, is discussed in an article by Dr. Arnold J. Rosenthal, "$TE^{1/2}$, An Index for Relating Fiber Tenacity and Elongation," Proceedings of the Symposium on Polypropylene Fibers, September, 1964, A Southern Research Institute Publication, Birmingham, Alabama.

The polymers of the present invention may be dissolved in a suitable solvent, e.g., dimethylacetamide, dimethylformamide, or dimethylsulfoxide, to form a spinning or casting solution which may be fabricated into filaments or films. After suitable post treatments such as drawing and heating, the filaments may be knitted or woven into fabrics having excellent high temperature properties and are useful in applications such as space suits, parachutes, and the like.

The principles, preferred embodiments, and modes of operation of the present invention have been described

What is claimed is:

1. In the process for the production of aromatic polybenzimidazoles wherein a first stage melt polymerization reaction is conducted in a reaction zone maintained at a temperature of above about 170° C. to yield a foamed prepolymer, which is thereafter subjected to a second stage solid state polymerization reaction in a reaction zone maintained at a temperature of above about 250° C. to yield the product aromatic polybenzimidazole, and wherein both reactions are conducted under substantially oxygen-free conditions at a pressure of from about one to two atmospheres, the improvement which comprises conducting the second stage reaction in the presence of from about 5 to 50 percent of phenol based on the weight of the prepolymer used.

2. The process of claim 1 wherein the aromatic polybenzimidazole obtained is poly-2,2'-(m-phenylene)-5,5'-bibenzimidazole, the pressure in both stages are at least equal to atmospheric, and a continuous flow of inert gas is maintained through the reaction zones to remove volatile reaction by-products.

3. In the process for the production of aromatic polybenzimidazoles wherein a first stage melt polymerization reaction is conducted in a reaction zone maintained at a temperature of above about 170° C. to yield a foamed prepolymer, which is thereafter subjected to a second stage solid state polymerization reaction in a reaction zone maintained at a temperature of above about 250° C. to yield the product aromatic polybenzimidazole, wherein both reactions are conducted under substantially oxygen-free conditions and at pressures at least equal to atmospheric, and wherein a continuous flow of inert gas is maintained through the reaction zones to remove volatile reaction by-products in the vapor space above the reacting materials, the improvement which comprises conducting the second state reaction in the presence of phenol in an amount of at least five percent by weight of the prepolymer present.

4. The process of claim 3 wherein the temperature maintained in the first reaction zone is above 200° C., and the temperature in the second reaction zone is above 325° C.

5. The process of claim 4 wherein the product aromatic polybenzimidazole is poly-2,2'(m-phenylene)-5,5'-bibenzimidazole having an inherent viscosity of at least 0.6 as determined by a solution of 0.4 gm. of said product dissolved in 100 ml. of 97% $H_2SO_4$ at 25° C.

6. The process of claim 4 wherein the inert gas is nitrogen and is passed through the zones at a flow rate of from 1 to 200 percent of the volume of the reaction zone per minute, and wherein reactants evolved with volatile reaction by-products in the first stage reaction are condensed and refluxed to the reaction zone.

7. In the process for the production of aromatic polybenzimidazoles wherein a first stage melt polymerization reaction is conducted in a reaction zone maintained at a temperature of above 200° C. to yield a foamed prepolymer, which is thereafter subjected to a second stage solid state polymerization reaction in a reaction zone maintained at a temperature of between 350° C. to 425° C. to yield the product aromatic polybenzimidazole, wherein both reactions are conducted under substantially oxygen-free conditions, at a pressure of from about one to two atmospheres, the improvement which comprises conducting the second stage reaction in the presence of phenol in an amount of from about five to twenty-five percent by weight of the prepolymer present.

8. The process of claim 7 wherein the prepolymer has an inherent viscosity of at least 0.1, and the product polybenzimidazole is poly-2,2'(m-phenylene)-5,5'-bibenzimidazole having an inherent viscosity of at least 0.6 as determined by 0.4 gm. pre- and polymer solutions respectively in 100 ml. of 97% $H_2SO_4$ at 25° C.

9. The process of claim 8 wherein the temperature in the first stage is about 250° to 300° C., and the amount of phenol present in the second stage is about ten to twenty percent by weight of the prepolymer present.

References Cited
UNITED STATES PATENTS

| | | | |
|---|---|---|---|
| Re. 26,065 | 7/1966 | Marvel et al. | 260—47 |
| 3,301,828 | 1/1967 | Marvel | 260—78.4 |
| 3,386,969 | 6/1968 | Levine | 260—78.4 |

WILLIAM H. SHORT, Primary Examiner

L. L. LEE, Assistant Examiner

U.S. Cl. X.R.

260—47, 78